United States Patent Office 3,422,128
Patented Jan. 14, 1969

3,422,128
π-ALLYL NICKEL COMPOUNDS AND
THEIR PREPARATION
Günther Wilke, Mulheim (Ruhr), Germany, assignor to
Studiengesellschaft Kohle m.b.H., Mulheim (Ruhr), Germany, a corporation
No Drawing. Filed Aug. 6, 1964, Ser. No. 388,000
Claims priority, application Germany, Aug. 10, 1963,
St 20,975
U.S. Cl. 260—439    11 Claims
Int. Cl. C08f 1/32; C07f 15/04; C07f 15/00

ABSTRACT OF THE DISCLOSURE

Production of π allyl nickel compounds by the reaction of a nickel olefinic hydrocarbon compound with allyl halides and products produced thereof. The compounds have utility as oligomerization and polymerization catalysts.

---

This invention relates to new and useful improvements in π-allyl-metal compounds. I have discovered that π-allyl compounds of the transition metals of side Groups III to VIII, and especially those of the IVth to VIIIth groups of the Periodic System, are as such, or in combination with other materials, for example Lewis acids and/or electron donors, such as Lewis bases and the like, excellent polymerization (including oligomerization) catalysts and especially for the production from mono- and diolefins of open chain oligomers and of higher molecular weight polymers. The obtaining of such π-allyl compounds for which the effective grouping is

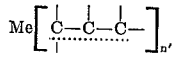

in which Me is a transition metal of the IIId to VIIIth side groups of the Periodic System and preferably of the IVth to VIIIth such group, and $n'$ is an integer of 1–4, has been set forth in my co-pending application, Ser. No. 272,881 and their use as polymerization catalysts is set forth in my co-pending application, Ser. No. 387,826, filed Aug. 6, 1964, corresponding to my corresponding German application, Ser. No. 20,976, filed in Germany about Aug. 10, 1963. Said last mentioned co-pending application further sets forth as polymerization catalysts such π-allyl compounds for which the effective grouping is

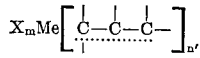

Me having the same meaning as above, X designating an anionic radical, and $m$ and $n$ each designating an integer of 1–3 with $m+n$ being 2–4.

One object of the invention comprises the production of certain specific compounds of the above type, i.e. π-allyl-Ni-halides of the general Formula I

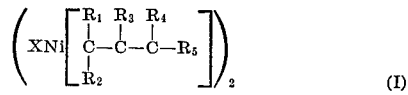

in which X signifies a halogen and $R_1$ to $R_5$, which may be similar or different, signify hydrogen, alkyl, cycloalkyl, aralkyl or aryl, wherein the radicals $R_1$ or $R_2$ or $R_3$ and $R_4$ or $R_5$ may also be bound into an olefinic unsaturated ring system, with at least 3 to 4 and preferably 5–12 ring members. As shown by the formula these compounds exist as dimers and it is characteristic that the nickel is bound therein to a π-allyl-system or π-allyl-systems, and in the simplest case to the π-allyl-group as such or its hydrocarbon, i.e. alkyl, aryl, or aralkyl and their cyclic derivatives. A π-allyl-system is defined as a grouping of 3 C-atoms, which is bound as a substantially planar system to a central atom in substantially the same manner by way of all 3 C-atoms.

In the simplest case of the bis-π-allyl-nickel with an empirical Formula II $(C_3H_5)_2Ni$ this type of bond is represented as follows:

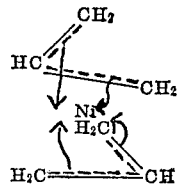

The roentgenographic structural analysis of the corresponding methyl derivative, the bis-π-methallyl nickel, has shown that a "sandwich" type compound is involved in which the two methallyl groups are bound to the nickel atom as planar systems in such manner that the $CH_3$ groups go into the anti-position:

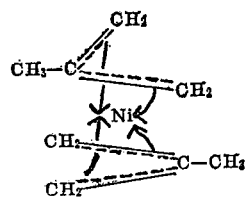

In the compounds of type I, producible in accordance with the invention, one each such planar π-allyl-system is bound to a nickel atom.

Some compounds of the type π-allyl-Ni-X are already known. Thus E. O. Fischer and G. Bürger (Z. Naturforsch., 16b, 77 (1961), report 94, 2409 (1961)) have for the first time described the preparation of the π-allyl-nickelbromide from the extremely poisonous nickelcarbonyl and allylbromide. The yields were given as only 11% of theory.

I have found that π-allyl-nickelhalides of the general Formula I may be produced very easily through action of the corresponding allylhalides on olefinic, i.e., only olefinically unsaturated hydrocarbons containing complexes of the nickel. Herein compounds are obtained in which the π-allyl-system according to the following Formula II is contained:

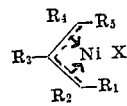

(II)

and in which $R_1$ to $R_5$ signify hydrogen, alkyl-, cycloalkyl-, aralkyl- or respectively aryl-groups, and for example the radicals $R_1/R_2$ and $R_4/R_5$ may also be bound into an olefinic unsaturated ring.

Suitable olefinic complexes of Ni are cycloolefinic Ni hydrocarbons as for example, the following complexes of the nickel-(O), producible according to the process described in my copending application, Ser. No. 104,221 corresponding to my German patent application St 16,427:

Cyclododecatriene-nickel, bis-cyclooctadiene - (1,5) - nickel, (cyclooctatetraene-nickel)x, tris-stilbene-nickel, tris-bicycloheptene-nickel, tris-trans - cyclooctene - nickel. Suitable allylhalides are those of the general Formula III

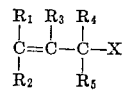

with $R_1$ to $R_5$ according to the above indicated definition, X being halogen and preferably chlorine, bromine or iodine.

The process in accordance with the invention proceeds, for example, from the second above-named olefinic-Ni-complex according to the following equation:

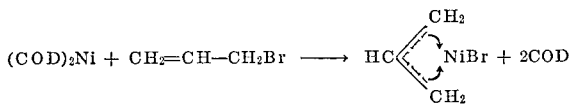

COD = Cyclooctadiene (1,5)

The reaction in accordance with the invention may be carried out either in the presence of a solvent inert for the reaction partners, or, if the allylhalide is liquid, without solvent. Suitable solvents are aliphatic saturated or aromatic hydrocarbons, and aliphatic or aromatic halogenated hydrocarbons or similar materials, including chlorbenzol, tetrahydrofuran and anisol and the like. Advantageously, the reaction is carried out at temperatures of from −20 to +20° C.

The great advantage of the process in accordance with the invention lies therein that, easily accessible and above all, harmless starting materials are used, and that the desired products are produced directly in substantially pure form and in practically quantitative yield without purification being necessary.

All operations must be carried out under exclusion of air and humidity, i.e., under protective gas, such as for example argon or nitrogen, since the compounds producible in accordance with the invention are sensitive to air or humidity.

EXAMPLE 1

2.1 g. bis-cyclooctadiene-nickel-(O) are suspended in 100 cm.³ ether and mixed at −10° with a solution of 1 g. allylbromide in ether under stirring. The solution becomes colored deep red and the yellow crystals of the starting complex go into solution. The ether is distilled off in vacuum, and the cyclooctadiene is removed at $10^{-4}$ torr and 20°. Obtained are 1.2 g.=90% of the theory of π-allylnickelbromide, which is somewhat volatile at $10^{-4}$ torr.

Calculated: Ni, 32.7%. Found: Ni, 32.1%.

EXAMPLE 2

To a suspension of 7.15 g. cyclooctatetraene-nickel-(O) in 100 cm.³ toluene is added drop by drop at 20° under stirring, a solution of 5.3 g. allylbromide in toluene. The solution becomes colored deep red and the crystals of the starting complex go slowly into solution. The red solution is filtered and freed at $10^{-4}$ torr from solvent and cyclooctatetraene. Obtained are 5 g.—63% of the theory π-allylnickelbromide.

Calculated: Ni, 32.7%. Found: Ni, 32.0%.

EXAMPLE 3

Into a mixture of 1.57 g. tris-bicycloheptene-nickel-(O) in 100 cm.³ toluene is added drop by drop at −30° a solution of 6.1 g. allylbromide in toluene under stirring. Obtained is a deep red solution, which is warmed to room temperature and then filtered. The solvent is distilled off in vacuum, and the residue dried at $10^{-4}$ torr. The product is recrystallized from ether, and obtained is a red powder of the composition $C_3H_5NiBr \cdot C_7H_{10}$, i.e. it is a π-allyl-nickelbromide, to which is still complex-bound a bicycloheptene-molecule.

Calculated: Ni, 21.4%. Found: Ni, 21.0%.

EXAMPLE 4

A suspension of 4.9 g. bis-cyclooctadiene-nickel-(O) in 100 cm.³ toluene is converted at −20° with a solution of 2.7 g. cinnamylchloride in toluene under stirring. Subsequently the suspension is stirred for two hours at −5 to −10°. Toluene and cyclooctadiene are distilled off in vacuum and the residue dried at $10^{-4}$ torr. The reaction product is dissolved in ether, filtered, and the clear solution cooled to −80°. Therein the π-cinnamylnickelchloride is separated in the form of red shining crystals of the composition $C_9H_9ClNi$.

Calculated: Ni, 27.8%. Found: Ni, 27.8%.

EXAMPLE 5

7.5 g. bis-cyclooctadiene-nickel-(O) are suspended in 100 cm.³ ether and converted at −20° with a solution of 6.0 g. 1-chloro-cyclooctene-(2). Obtained is a clear red solution which is evaporated in vacuum. The residue is dried at $10^{-4}$ torr and freed from cyclooctadiene. The reaction product is recrystallized from ether. Obtained are 4.2 g.=81% of the theory of π-cyclooctenyl-nickelchloride.

Calculated: Ni, 28.9%. Found: Ni, 28.8%.

EXAMPLE 6

According to Example 5 bis-cyclooctadiene-nickel-(O) is converted with 1-chlorocyclohexene-(2). Obtained is a red solution which contains the π-cyclohexenyl-nickelchloride.

EXAMPLE 7

According to Example 5 bis-cyclooctadiene-nickel is converted with cyclododecatrienylchloride. Obtained is a red solution which contains a π-cyclododecatrienyl-nickelchloride.

EXAMPLE 8

8.4 g.=30.5 mmol. bis-cyclooctadiene-nickel-(O) are dissolved in 30 cc. of toluene and there is dropwise added at −40° C. 3.5 g.=24.1 mmol. of 3-chlor-cyclopentene. In the course of the addition, the yellow solution turns dark red. Traces of metallic nickel were separated and removed. The clear solution is concentrated to dryness after 36 hours at $10^{-4}$ torr. The red colored residue is extracted with pentane. There then remains undissolved the π-cyclopentenyl-nickel-chloride. The red product is filtered off and dried. There are then obtained 3.5 g.=71.5% of theory of π-cyclopentenyl-nickelchloride.

Calculated: Ni, 36.4%. Found: Ni, 36.8%.

EXAMPLE 9

6.1 g.=22.2 mmol. bis-cyclooctadiene-nickel-(O) are dissolved in 50 cc. of toluene, whereupon there is added at −20° C. 4.1 g=24.5 mmol. of benzylallylchloride (1-phenyl-4-chlor-butene-(2)) dissolved in 40 cc. of toluene. The yellow colored solution turns red. The toluene is removed at $10^{-4}$ torr and the orange-red colored residue is then extracted with pentane. The red colored product is then filtered off and dried in vacuo. There are obtained 4 g.=80% of theory of the benzyl-π-allyl-nickelchloride.

Calculated: Ni, 26.04%. Found: Ni, 25.6%.

EXAMPLE 10

82.0 g.=0.3 mol. of bis-cyclooctadiene-nickel-(O) are suspended in 300 cc. of ether, whereupon there is added at −20° C. with vigorous stirring, a solution of 40 g.=0.33 mol. of allylbromide within a period of 3–4 hours. After the reaction is completed, the mixture is cooled down to −80°. There then precipitates the π-allyl-nickelbromide which is filtered off.

Calculated: Ni, 32.6%. Found: Ni, 32.2%.

EXAMPLE 11

51.2 g.=0.186 mol. of bis-cyclooctadiene-nickel-(O) are suspended in 750 cc. of ether, whereupon there is added a solution of 33.3 g.=0.206 mol. allyliodide in 200 cc. ether with vigorous stirring within a period of 3 hours at −10° C. The mix is thereafter heated to 0° and stirring is continued until the crystals of the starting complex have completely dissolved. One now cools to −80° C. and filters off the separated π-allyl-nickeliodide. The yield is 34.1 g.=80% of theory.

Calculated: Ni, 25.9%. Found: Ni, 25.5%.

EXAMPLE 12

23 g.=83.6 mmol. bis-cyclooctadiene-nickel-(O) are suspended in 50 cc. of ether and are then admixed at −20° C. in the course of 15 hours with a solution of 19.8 g.=92.2 mmol. myrtenylbromide in 50 cc. ether with stirring. After about 36 hours the starting complex material has been converted. The solution is filtered at −20° C. and is thereafter cooled to −80° C. The red crystals separate. They are filtered off at a low temperature and are dried at $10^{-4}$ torr. There is obtained 10.5 g.=46% of theory of pure π-pinenyl-nickelbromide.

EXAMPLE 13

6.9 g.=25 mmol. bis-cyclooctadiene-nickel-(O) in 8 cc. of toluene are admixed at −10° C. with a suspension of 10 g. of 1,2,3-triphenyl-cyclopropenylbromide in 30 cc. of toluene. The mixture is stirred for a period of 24 hours. Thereafter all of the volatile components are distilled off at $10^{-4}$ torr and the residue is thereafter crystallized from toluene at +60° C. There are obtained 7 g.=69% of theory of 1,2,3-triphenyl-π-cyclopropenyl-nickelbromide.

The properties, activity and reactivity of the π-allyl Ni compounds herein described are solely due to the π-allyl linkage and the particular stereo positioning of atoms thereby defined. Thus their effective grouping which is controlling for said properties, activity and reactivity is

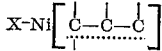

(X being halogen) regardless of any particular substituent. Similarly the reactivity in accordance with the invention of the olefinically unsaturated cyclohydrocarbon Ni compounds is based upon the therein inherent lability of the hydrocarbon linkage regardless of any substituents, while the reactivity of the allylhalide is based upon the particular configuration of the grouping

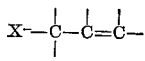

and the relative lability imparted to the halogen thereby, substantially unaffected by any substituents including those incorporating the alkyl chain itself into a ring system. This is well illustrated by the fact that small and long chain aliphatic substituents, cyclic substituents including those of the bulky pinenyl and various aromatic substituents, all as shown by the at-times highly substituted or cyclo-allyl halides used, do not affect their basic reactivity in accordance with the invention.

Polymerization by the use of the compounds in accordance with the invention may be effected by, for instance, contacting the same with a mono- or diolefin or contacting such compound in combination with a Lewis acid and/or a Lewis base (electron donor) with such mono- or diolefin.

I claim:
1. Method for the production of a π-nickel-allyl compound having an anionic radical linked thereto, which comprises reacting a nickel cycloolefinic hydrocarbon compound with an allyl halide.
2. Method in accordance with claim 1 in which said halide is one selected from the group consisting of chloride, bromide and iodide.
3. Method in accordance with claim 2 in which said reacting is carried out in liquid phase.
4. π-cinnamyl-nickelchloride.
5. π-cyclooctenyl-nickelchloride.
6. π-cyclohexenyl-nickelchloride.
7. π-cyclododecatrienyl-nickelchloride.
8. π-cyclopentenyl-nickelchloride.
9. benzyl-π-allylnickelchloride.
10. π-pinenyl-nickelbromide.
11. 1,2,3-triphenyl-π-cyclopropenyl-nickelbromide.

References Cited

UNITED STATES PATENTS 3,159,658  12/1964  Fischer et al. _____ 260—429

OTHER REFERENCES

Jones et al.: Tetrahedron Letters, No. 2 (1961), pp. 48–50.
Fischer et al.: Z·Naturforschg. 16b (1961), pp. 77–78.
Huttel et al.: Angew. Chem., vol. 71 (1959), p. 456.

TOBIAS E. LEVOW, *Primary Examiner.*

A. P. DEMERS, *Assistant Examiner.*

U.S. Cl. X.R.

252—431; 260—94.3, 666

UNITED STATES PATENT OFFICE
CERTIFICATE OF CORRECTION

Patent No. 3,422,128                  January 14, 1969

Günther Wilke

It is certified that error appears in the above identified patent and that said Letters Patent are hereby corrected as shown below:

Column 5, line 43, "alkyl" should read -- allyl --.

Signed and sealed this 17th day of March 1970.

(SEAL)
Attest:

Edward M. Fletcher, Jr.
Attesting Officer

WILLIAM E. SCHUYLER, JR.
Commissioner of Patents